(12) United States Patent
McCaldon

(10) Patent No.: US 9,963,163 B2
(45) Date of Patent: May 8, 2018

(54) SYSTEMS AND METHODS FOR ASSISTING HAND-PROPELLED VEHICLES

(71) Applicant: Ken McCaldon, Warrenton, VA (US)

(72) Inventor: Phillip Ken McCaldon, Marshall, VA (US)

( * ) Notice: Subject to any disclaimer, the term of this patent is extended or adjusted under 35 U.S.C. 154(b) by 0 days. days.

(21) Appl. No.: 15/040,800

(22) Filed: Feb. 10, 2016

(65) Prior Publication Data

US 2016/0347342 A1    Dec. 1, 2016

Related U.S. Application Data

(60) Provisional application No. 62/169,237, filed on Jun. 1, 2015.

(51) Int. Cl.
*B62B 5/06* (2006.01)
*B62B 1/18* (2006.01)

(52) U.S. Cl.
CPC ............... *B62B 5/068* (2013.01); *B62B 1/18* (2013.01)

(58) Field of Classification Search
CPC .. B62B 1/18; B62B 1/20; B62B 1/204; B62B 5/062; B62B 5/068
See application file for complete search history.

(56) References Cited

U.S. PATENT DOCUMENTS

| | | | |
|---|---|---|---|
| 2004/0025623 A1 | 2/2004 | Dunbar | |
| 2005/0211740 A1* | 9/2005 | Sekulic | A45F 3/14 224/258 |
| 2005/0279791 A1* | 12/2005 | Komorowski | A45C 13/38 224/260 |
| 2006/0043129 A1* | 3/2006 | Palmby | B62B 5/068 224/184 |
| 2008/0150245 A1* | 6/2008 | Clatt | B62B 1/14 280/47.24 |
| 2008/0174078 A1* | 7/2008 | Dooley | A45F 3/08 280/1.5 |
| 2009/0014483 A1* | 1/2009 | Green | A41D 13/0007 224/157 |
| 2009/0126150 A1* | 5/2009 | Tanaya | A01D 34/82 16/112.1 |
| 2009/0261540 A1* | 10/2009 | Mejia | B62B 5/068 280/1.5 |
| 2012/0181764 A1* | 7/2012 | Skijus | B62B 1/20 280/47.315 |
| 2013/0146629 A1* | 6/2013 | Glines | A45F 3/14 224/260 |
| 2015/0021368 A1* | 1/2015 | Nilsen | B62B 5/068 224/257 |
| 2016/0229438 A1* | 8/2016 | Morse | B62B 5/068 |

* cited by examiner

*Primary Examiner* — Barry Gooden, Jr.
(74) *Attorney, Agent, or Firm* — Foley & Lardner LLP

(57) ABSTRACT

A method of assisting in the mobility of a wheelbarrow includes the steps of coupling a first coupling arm and a second coupling arm of an assist device to a portion of a top edge of the wheelbarrow; orienting a first flexible connector and a second flexible connector underneath the wheelbarrow such that the first flexible connector and the second flexible connector are contactable with a shell of the wheelbarrow; grasping a handle coupled to the first flexible connector and the second flexible connector by an assistant; grasping handles of the wheelbarrow by an operator; applying a first force from the operator to the handles, elevating legs of the wheelbarrow; providing a second force by the assistant on the handle; and maintaining the first force while the second force is provided.

20 Claims, 5 Drawing Sheets

SYSTEMS AND METHODS FOR ASSISTING HAND-PROPELLED VEHICLES

CROSS-REFERENCE TO RELATED APPLICATION

This application claims priority under 35 U.S.C. § 119(e) to U.S. Provisional Patent Application Ser. No. 62/169,237 filed on Jun. 1, 2015, the complete disclosure of which is incorporated by reference herein in its entirety.

TECHNICAL FIELD

The present disclosure relates to the field of hand-propelled vehicles. More specifically, the present disclosure relates to a system and method for assisting in the use of a wheelbarrow.

BACKGROUND

Hand-propelled vehicles (e.g., wheelbarrows, dollies, hand trucks, etc.) are used to aid in the transportation of material such as landscape material (e.g., felled trees, logs, dirt, gravel, sand, mulch, sod, water, fluids, seed, etc.), construction material (e.g., bricks, cement, mortar, asphalt, debris, etc.), equipment (e.g., landscaping equipment, construction equipment, etc., tools, implements, etc.), containers, packages, and other material over land. Hand-propelled vehicles may be used in commercial, industrial, and residential settings. For example, a hand-propelled vehicle may be used to transport dirt between locations of a landscaping project.

To facilitate the transportation of material, hand-propelled vehicles often include a number of handles, a support structure, and a number of wheels. The number of wheels may be mounted to a combination of the number of handles and the support structure. The support structure may include a number of legs. Conventional hand-propelled vehicles are operated by a user by interacting with the handles. The hand-propelled vehicle may be operable between a static state and a dynamic state. In the static state, the user may collect material and may deposit material. While in the static state, the wheelbarrow may be supported and secured (e.g., maintained, etc.) by the number of legs in a stable position. In the dynamic state, the user may move the hand-propelled vehicle, may collect material, and may deposit material. For example, for a hand-propelled vehicle with one wheel, the user may steer the hand-propelled vehicle by tilting the hand-propelled vehicle in a desired direction. However, when the hand-propelled vehicle is transporting heavy, bulky, and/or cumbersome material, the hand-propelled vehicle may become difficult to move and steer resulting in difficult operation for the user.

Accordingly, it is desirable to assist in the operation of a hand-propelled vehicle (e.g., wheelbarrow). In particular, it is desirable to assist in the moving and steering of a hand-propelled vehicle when operation of the hand-propelled vehicle would typically be cumbersome (e.g., heavy load, movement up an incline, etc.).

SUMMARY

One embodiment relates to an assist device for a hand-propelled vehicle. The assist device includes a first coupling arm, a second coupling arm, an upper brace, a lower brace, a first flexible connector, a second flexible connector, and a handle. The first coupling arm includes a first front portion and a first rear portion separated by a first distance. The second coupling arm includes a second front portion and a second rear portion separated by a second distance substantially equal to the first distance. The upper brace includes a first length. The upper brace is configured to be fastened to the first coupling arm and the second coupling arm. The lower brace includes a second length substantially equal to the first length. The lower brace is configured to be fastened to the first coupling arm and the second coupling arm. The first flexible connector is coupled to at least one of the lower brace and the upper brace. The second flexible connector is coupled to at least one of the lower brace and the upper brace. The handle is configured to receive the first flexible connector and the second flexible connector. The upper brace is coupled to the first rear portion and the second rear portion. The lower brace is coupled to the first rear portion and the second rear portion. The lower brace is substantially parallel to the upper brace. The first coupling arm and the second coupling arm are configured to releasably couple the assist device to a portion of a top edge of the hand-propelled vehicle.

Another embodiment related to a method for making an assist device for assisting in the maneuverability of a hand-propelled vehicle. The method includes the steps of forming a first arm blank, a second arm blank, an upper brace, a lower brace, and a handle; deforming the first arm blank according to a first desired profile resulting in a first coupling arm; deforming the second arm blank according to a second desired profile resulting in a second coupling arm; inserting one of a first flexible connector and a second flexible connector through the handle; forming a looped interface on the first flexible connector and the second flexible connector; inserting the lower brace through the looped interface of the first flexible connector and the looped interface of the second flexible connector; securing the lower brace to the first coupling arm and the second coupling arm; and securing the upper brace to the first coupling arm and the second coupling arm.

Another embodiment relates to a method of assisting in the mobility of a wheelbarrow. The method includes the steps of coupling a first coupling arm and a second coupling arm of an assist device to a portion of a top edge of the wheelbarrow; orienting a first flexible connector and a second flexible connector underneath the wheelbarrow such that the first flexible connector and the second flexible connector are contactable with a shell of the wheelbarrow; grasping a handle coupled to the first flexible connector and the second flexible connector by an assistant; grasping handles of the wheelbarrow by an operator; applying a first force from the operator to the handles, elevating legs of the wheelbarrow; providing a second force by the assistant on the handle; and maintaining the first force while the second force is provided.

DETAILED DESCRIPTION

Figure 1:
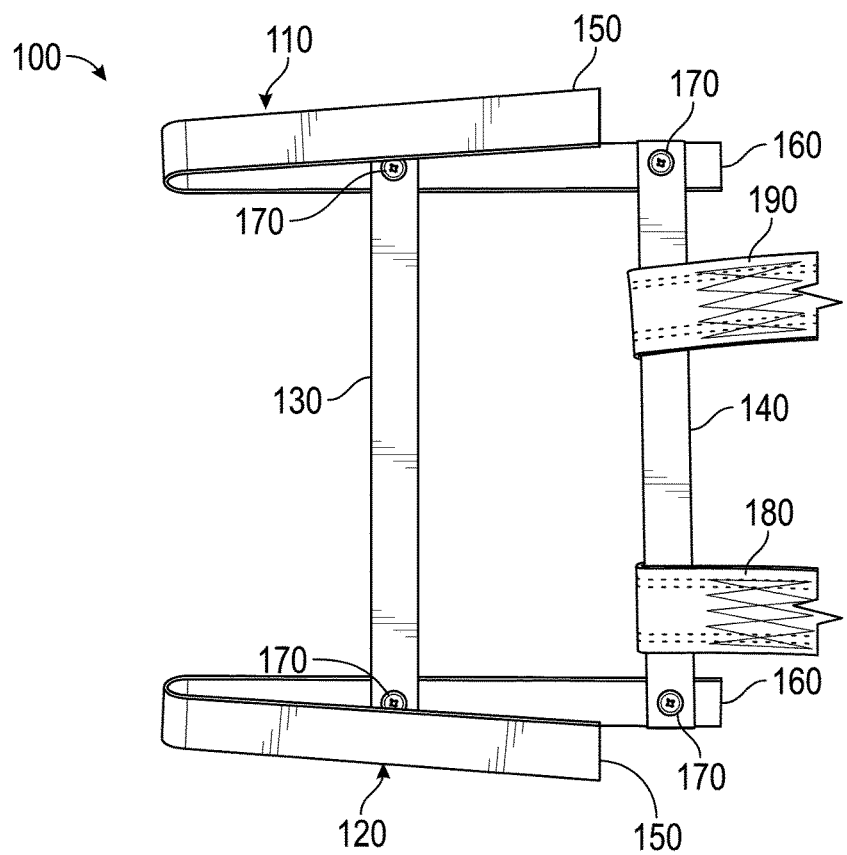
FIG. 1 is a top view of an assist device, according to an exemplary embodiment.

In the following detailed description, reference is made to the accompanying drawings, which form a part thereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring to the Figures generally, various embodiments disclosed herein relate to an assist device for a hand-propelled vehicle (e.g., wheelbarrows, dollies, hand trucks, etc.). The assist device may include a first coupling arm and a second coupling arm each of which may be attached to the hand-propelled vehicle. The assist device may further include an upper brace and a lower brace each configured to structurally couple the first coupling arm to the second coupling arm. The assist device may further include a first flexible connector and a second flexible connector each independently coupled to the lower brace. In some embodiments, the first flexible connector and the second flexible connector are structurally integrated to form a continuous flexible connector. The assist device may further include a handle coupled to the first flexible connector and the second flexible connector.

The first coupling arm and the second coupling arm may mount on a top edge of the hand-propelled vehicle. The first flexible connector and the second flexible connector may be drawn under the hand-propelled vehicle to a location in front of the hand-propelled vehicle a target distance. In operation of the hand-propelled vehicle, a user operates (e.g., maneuvers, drives, steers, pushes, etc.) the hand-propelled vehicle while an assistant pulls the handle, and thereby the first flexible connector and the second flexible connector, in a desired direction of travel of the hand-propelled vehicle. The assistant may thereby stabilize the hand-propelled vehicle and assist in the operation of the hand-propelled vehicle. In some embodiments, the assistant assists in emptying the hand-propelled vehicle. These and other features of the present disclosure are described more fully herein.

Referring now to FIGS. 1 and 4-6, a device (e.g., tool, implement, etc.), shown as assist device 100, includes a first arm (e.g., hook, member, structure, etc.), shown as first coupling arm 110, a second arm (e.g., hook, member, structure, etc.), shown as second coupling arm 120, a first brace (e.g., bar, beam, support, etc.), shown as upper brace 130, a second brace (e.g., bar, beam, support, etc.), shown as lower brace 140, a number of fasteners (e.g., bolts, etc.), shown as fasteners 170, a first connector (e.g., strap, rope, etc.), shown as first flexible connector 180 (e.g., first end), and a second flexible connector (e.g., strap, rope, etc.), shown as second flexible connector 190 (e.g., second end). In various embodiments, first coupling arm 110 and second coupling arm 120 each individually include a first portion, shown as front portion 150, and a second portion, shown as rear portion 160.

Assist device 100 may be configured to be coupled to a hand-propelled vehicle (e.g., wheelbarrows, dollies, hand trucks, etc.). For example, assist device 100 may be used with a wheelbarrow. In various embodiments, first coupling arm 110 and second coupling arm 120 are spaced a target distance apart configured to facilitate use of assist device 100 with a particular hand-propelled vehicle (e.g., wheelbarrow). In one example, first coupling arm 110 and second coupling arm 120 are spaced a target distance apart that is greater than the width of a wheel of a wheelbarrow. In some embodiments, upper brace 130 and lower brace 140 have a length that is greater than the target distance between first coupling arm 110 and second coupling arm 120. In one embodiment, upper brace 130 and lower brace 140 are substantially parallel to each other and substantially perpendicular to first coupling arm 110. Upper brace 130 and lower brace 140 may be configured to provide structural support and bracing between first coupling arm 110 and second coupling arm 120.

In some embodiments, first flexible connector 180 and second flexible connector 190 are coupled to lower brace 140. In other embodiments, first flexible connector 180 and second flexible connector 190 are coupled to upper brace 130. In one embodiment, first flexible connector 180 and second flexible connector 190 are coupled to upper brace 130 and lower brace 140. According to various embodiments, first flexible connector 180 and second flexible connector 190 are individually coupled to upper brace 130 and/or lower brace 140 through a looped interface. For example, first flexible connector 180 and second flexible connector 190 may be constructed from a strap material that includes a looped interface configured to receive upper brace 130 and/or lower brace 140. First flexible connector 180 and second flexible connector 190 may be separated by a separation distance. The separation distance may be greater than the width of a wheel (e.g., wheel 230) of a hand-propelled vehicle (e.g., wheelbarrow 200). In some embodiments, the separation distance is greater than the width of a wheel and less than the lesser of the length of upper brace 130 and lower brace 140.

First flexible connector 180 and second flexible connector 190 may be constructed of any rope, strand, strap, chain, wire, mesh, or any combination thereof such that assist device 100 may be tailored for a target application. Similarly, first flexible connector 180 and second flexible connector 190 may be coated or covered. For example, first flexible connector 180 and second flexible connector 190 may be coated in an ultra-violet and weather resistant coating. For example, first flexible connector 180 and second flexible connector 190 may be constructed from nylon rope, manila rope, sisal rope, jute rope, polypropylene rope, polyethylene rope, polyester rope, poly anchor rope, sure knot poly rope, nylon strap, other strap material, wire rope, rubber rope, rubber cord, and any other suitable rope or strand or any combination thereof such that assist device 100 may be tailored for a target application.

In various embodiments, front portion 150 and rear portion 160 are spaced a target distance apart to facilitate the use of assist device 100 with a target hand-propelled vehicle. For example, the target distance between front portion 150 and rear portion 160 may correspond to a configuration of a top edge of a wheelbarrow. The length of front portion 150 and rear portion 160 may be individually configured to facilitate the use of assist device 100 with a target hand-propelled vehicle (e.g., wheelbarrow). In some embodiments, first coupling arm 110 and second coupling arm 120 are configured to be congruent. First coupling arm 110 and second coupling arm 120 may have a substantially hooked shape.

In various embodiments, first coupling arm 110 and second coupling arm 120 are individually coupled (e.g., secured, fastened, etc.) to upper brace 130 and lower brace 140 through the use of fasteners 170. According to various embodiments, upper brace 130 and lower brace 140 are fastened to first coupling arm 110 and second coupling arm 120. Fasteners 170 may be a threaded combination such as a nut and bolt, a threaded insert and bolt, or any other suitable fastener such that assist device 100 is tailored for a target application. In some examples, fasteners 170 may be a tool-less fastener. In other examples, fasteners 170 may be replaced with welded, riveted, or otherwise permanently attached connections. Additional hardware may be included in addition to fasteners 170 such as washers, lock washers, bushings, bearings, spacers, and sleeves. In some examples, first coupling arm 110, second coupling arm 120, upper brace 130, and lower brace 140 may include holes that are countersunk and configured to receive fasteners 170. Upper brace 130 and lower brace 140 may be individually defined by a length (e.g., twenty centimeters, thirty centimeters, etc.). In some embodiments, the length of upper brace 130 is equal to the length of lower brace 140.

In some embodiments, first coupling arm 110 and/or second coupling arm 120 include an additional gripping mechanism to aid in the coupling of assist device 100 to a target hand-propelled vehicle. For example, first coupling arm 110 and/or second coupling arm 120 may include a rubberized surface on front portion 150 and/or rear portion 160 configured to interact with a surface of the hand-propelled vehicle. In another example, first coupling arm 110 and/or second coupling arm 120 include a number of magnets or magnetic surface on front portion 150 and/or rear portion 160 configured to interact with a metallic material of the hand-propelled vehicle. According to yet other examples, it may be desirable to secure assist device 100 to the hand-propelled vehicles. In these examples, at least one of first coupling arm 110, second coupling arm 120, upper brace 130, and lower brace 140 may be configured to couple to the hand-propelled vehicle through the use of a threaded combination such as a nut and bolt, a threaded insert and bolt, or any other suitable fastener such that assist device 100 is tailored for a target application. In some examples, at least one of first coupling arm 110, second coupling arm 120, upper brace 130, and lower brace 140 may be configured to couple to the hand-propelled vehicle through the use of a tool-less fastener. In other examples, at least one of first coupling arm 110, second coupling arm 120, upper brace 130, and lower brace 140 may be configured to couple to the hand-propelled vehicle through the use of a welded, riveted, or otherwise permanently attached connection. In alternative embodiments, first coupling arm 110 and second coupling arm 120 clamp onto top edge 250. In some alternative applications, rather than attaching to top edge 250, first coupling arm 110 and second coupling arm 120 may couple to handles 210 or legs 220.

In some applications, assist device 100 may include additional braces members in place of or in addition to upper brace 130 and lower brace 140. In other applications, assist device 100 may not include upper brace 130 or lower brace 140. In an alternative embodiment, assist device 100 is formed out of a one piece construction, thereby integrally including first coupling arm 110, second coupling arm 120, upper brace 130, and lower brace 140. According to this example, the one piece construction may include holes configured to receive first flexible connector 180 or second flexible connector 190.

It may be desirably to be able to adjust assist device 100 for many different hand-propelled vehicles. Accordingly, in some embodiments, first flexible connector 180 and second flexible connector 190 are slidably coupled to lower brace 140 such that first flexible connector 180 and/or second flexible connector 190 may be translated along lower brace 140. In these examples, locations of first flexible connector 180 and second flexible connector 190 may be tailored for a target application. In other embodiments, first flexible connector 180 and second flexible connector 190 are rigidly secured to lower brace 140 such that they may not translate along lower brace 140. According to other examples, first flexible connector 180 and second flexible connector 190 may be replaced by a single flexible member. According to various embodiments, first flexible connector 180 and second flexible connector 190 are coextensive. In some embodiments, first flexible connector 180 is structurally integrated within second flexible connector 190, and vice versa.

According to various examples, first coupling arm 110, second coupling arm 120, upper brace 130, and lower brace 140 may be constructed from a metallic, plastic, polymeric, or composite material. In some embodiments, first coupling arm 110, second coupling arm 120, upper brace 130, and lower brace 140 is constructed from aluminum or stainless steel sheet metal or flat bar stock. First coupling arm 110, second coupling arm 120, upper brace 130, and lower brace 140 may be coated, painted, plated, anodized, galvanized, or otherwise treated. For example, first coupling arm 110, second coupling arm 120, upper brace 130, and lower brace 140 may be painted to match a desired color such as the color of a target hand-propelled vehicle.

Figure 2:
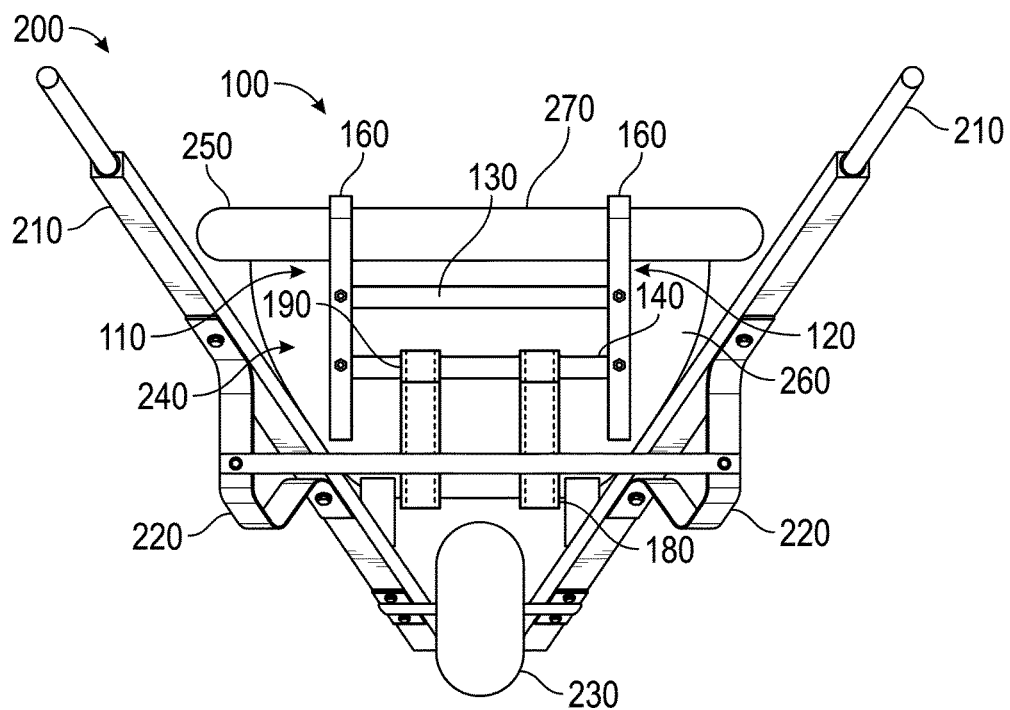
FIG. 2 is a rear view of the assist device shown in FIG. 1 installed on a wheelbarrow, according to an exemplary embodiment.

Referring to FIG. 2, assist device 100 is shown coupled to a hand-propelled vehicle (e.g., wheelbarrow, dolly, hand truck, etc.), shown as wheelbarrow 200. In various embodiments, wheelbarrow 200 includes handles, shown as handles 210, legs (e.g., stands, etc.) shown as legs 220, a wheel, shown as wheel 230, and a trough (e.g., basin, bed, etc.), shown as trough 240. Trough 240 may include an edge, shown as top edge 250, and a body, shown as shell 260. Wheelbarrow 200 may be a conventional wheelbarrow utilized to transport material such as landscape material (e.g., felled trees, logs, dirt, gravel, sand, mulch, sod, water, fluids, seed, etc.), construction material (e.g., bricks, cement, mortar, asphalt, debris, etc.), equipment (e.g., landscaping equipment, construction equipment, etc., tools, implements, etc.), containers, packages, and other material over land. Trough 240 may be configured to store the material during transportation. Wheelbarrow 200 may be operable between a static state and a dynamic state. In the dynamic state, a user may operate wheelbarrow 200 by applying a vertical force (e.g., lifting force) to handles 210 and then biasing (e.g., pushing, pulling, rotating, etc.) wheelbarrow 200 on wheel 230 over a surface (e.g., ground, land, earth, etc.). When the user is not operating wheelbarrow 200, wheelbarrow 200 is in the static state and may be rested on legs 220.

According to various embodiments, assist device 100 may be coupled (e.g., mounted, attached, etc.) to wheelbarrow 200 through the interaction of first coupling arm 110 and second coupling arm 120 with top edge 250 and shell 260. Top edge 250 may be continuous about trough 240 and may be formed from shell 260 in a rolling (e.g., bending, etc.) operation. First coupling arm 110 and second coupling arm 120 may be configured to receive a portion of top edge 250.

According to various embodiments, first coupling arm 110 and second coupling arm 120 are releasably coupled to top edge 250 of wheelbarrow 200. In some embodiments, front portion 150 and rear portion 160 of first coupling arm 110 and/or second coupling arm 120 may be separated by a target distance configured to receive a portion of top edge 250. In one embodiment, front portion 150 and rear portion 160 of first coupling arm 110 are separated a distance equal to a separated distance of front portion 150 and rear portion 160 of second coupling arm 120.

First flexible connector 180 and second flexible connector 190 may be separated by a distance greater than a width of wheel 230. As shown in FIG. 2, first flexible connector 180 and second flexible connector 190 may be disposed on opposing lateral sides of wheel 230. In some examples, wheelbarrow 200 may include two wheels. In these examples, first flexible connector 180 and second flexible connector 190 may be disposed between the two wheels or individually disposed outside of the two wheels. In other embodiments, at least one of first flexible connector 180 and second flexible connector 190 are positioned at least partially over wheel 230.

While assist device 100 has been shown and described as including both first flexible connector 180 and second flexible connector 190, it is understood that assist device 100 may incorporate only one of first flexible connector 180 and second flexible connector 190, or more supplement or replace first flexible connector 180 and/or second flexible connector 190 with an additional connecting member (e.g., flexible connector).

Figure 3:
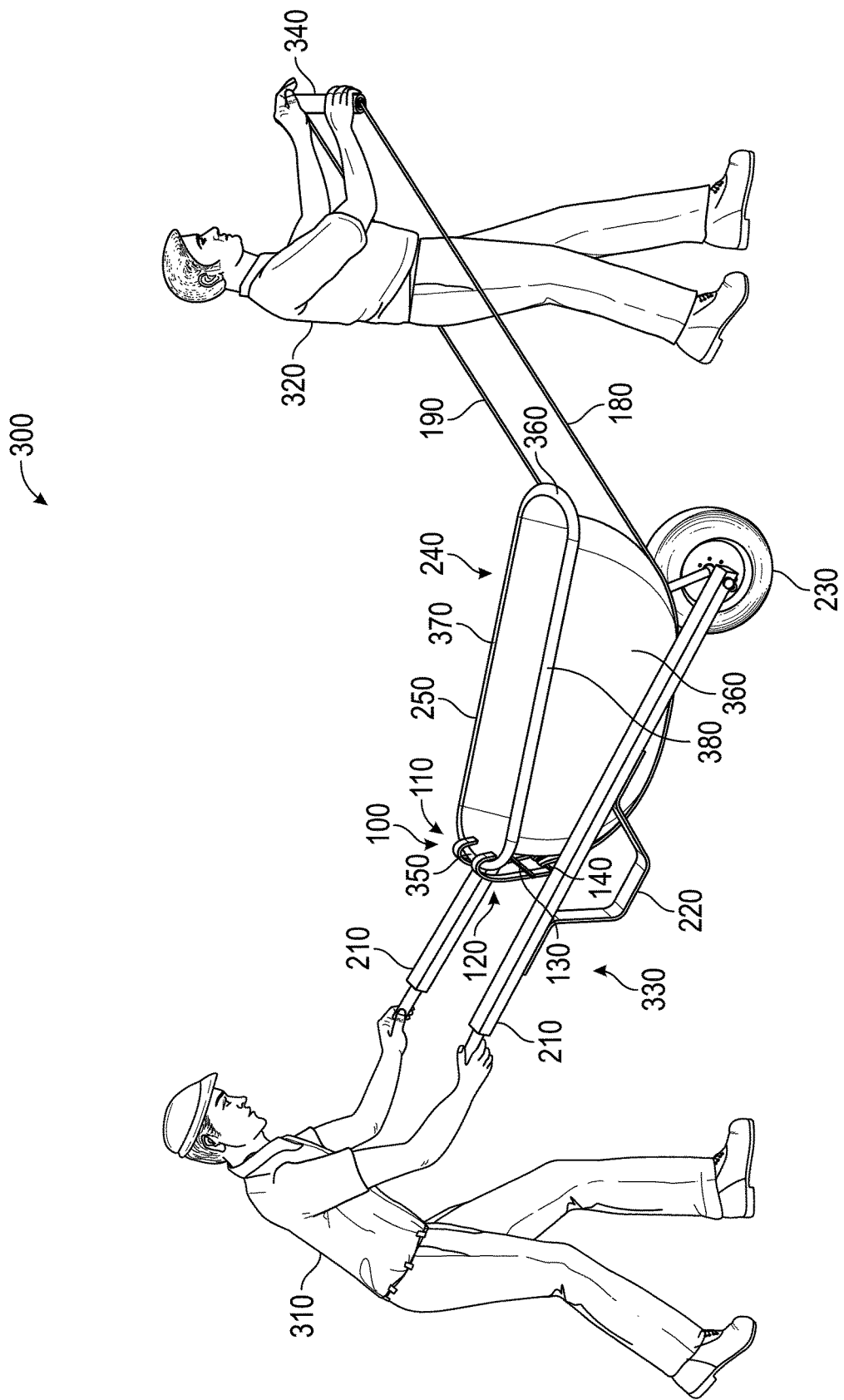
FIG. 3 is a side view an assisted operation including the assist device shown in FIG. 1 installed on another wheelbarrow, according to an exemplary embodiment.
Figure 4:
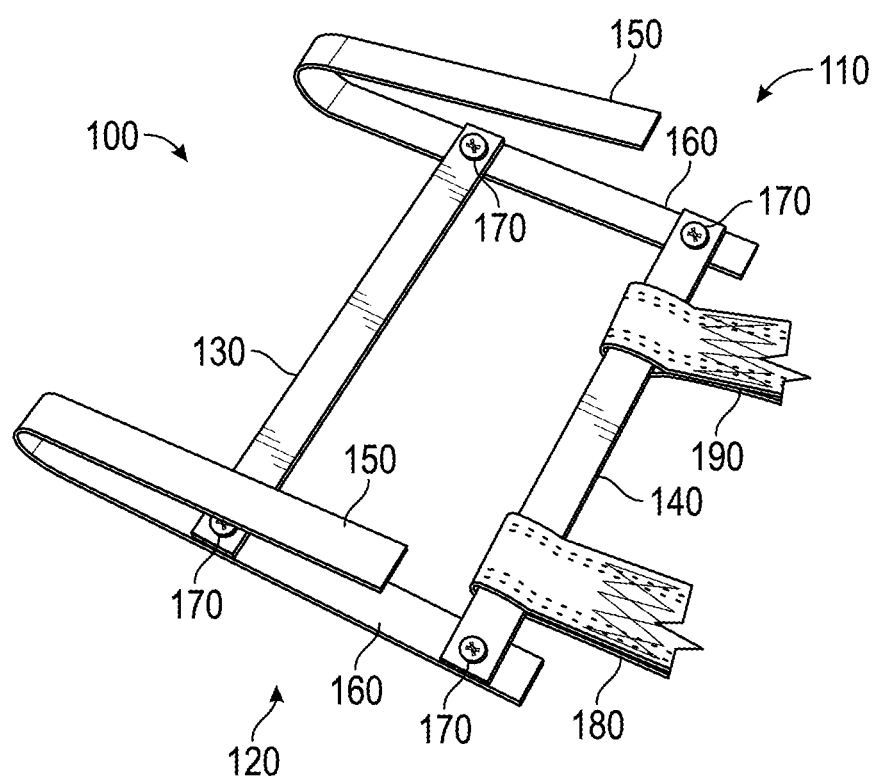
FIG. 4 is a top perspective view of the assist device shown in FIG. 1.
Figure 5:
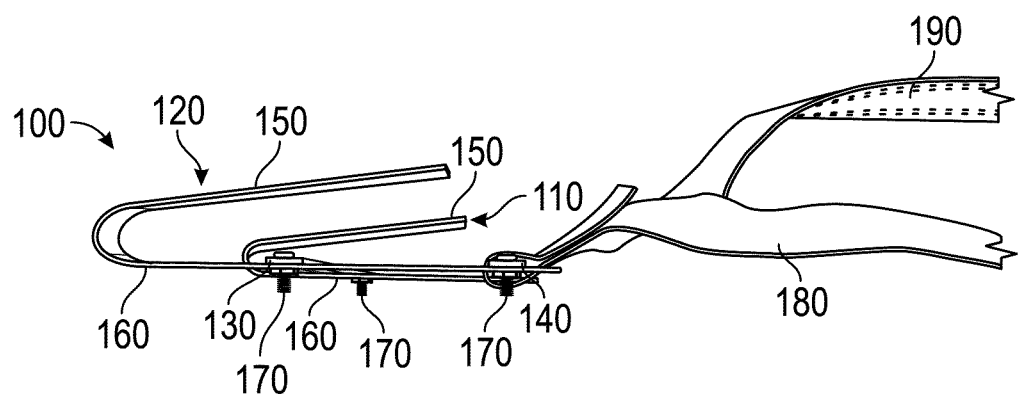
FIG. 5 is a side view of the assist device shown in FIG. 1.
Figure 6:
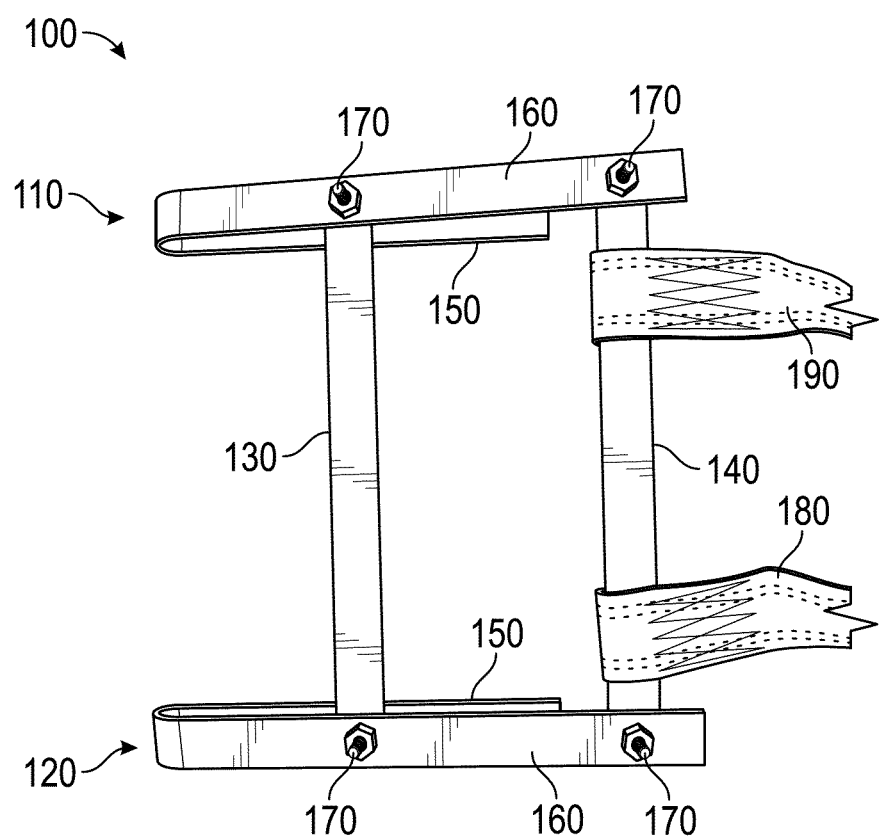
FIG. 6 is a bottom view of the assist device shown in FIG. 1.

As shown in FIG. 3, an operation, shown as assisted operation 300, includes an operator (e.g., laborer), shown as operator 310, an assistant (e.g., laborer), shown as assistant 320, a hand-propelled vehicle (e.g., wheelbarrow, dolly, hand truck, etc.), shown as wheelbarrow 330, and a handle, shown as handle 340. Similar to wheelbarrow 200, wheelbarrow 330 may include handles 210, legs 220, wheel 230, trough 240, top edge 250, and shell 260. In various embodiments, wheelbarrow 330 is the same as wheelbarrow 200. According to various embodiments, handle 340 is coupled to first flexible connector 180 and second flexible connector 190. Handle 340 may be located over a center portion of a single flexible member containing first flexible connector 180 and second flexible connector 190. In some embodiments, first flexible connector 180 and second flexible connector 190 comprise a single flexible member. It is understood that the arrangement of components and the particular configuration of components in wheelbarrow 200 and wheelbarrow 330 is illustrative only, and that assist device 100 may be utilized on a number of different hand-propelled vehicles having differing components and configurations from wheelbarrow 200 and wheelbarrow 330.

According to various embodiments, top edge 250 may be defined by a rearward edge, shown as rear edge 350, a forward edge, shown as front edge 360, a first side edge, shown as first lateral edge 370, and a second side edge, shown as second lateral edge 380. According to various examples, assist device 100 may be coupled to any of rear edge 350, front edge 360, first lateral edge 370, and second lateral edge 380. In assisted operation 300, a user (e.g. operator 310, assistant 320, etc.) may couple assist device 100 to wheelbarrow 330 by coupling first coupling arm 110 and second coupling arm 120 to rear edge 350 of top edge 250 such that front portions 150 are at least partially in contact with rear edge 350 of top edge 250. The user may then ensure that first flexible connector 180 and second flexible connector 190 are properly coupled to assist device 100.

According to various embodiments, first flexible connector 180 and second flexible connector 190 are operable between a dynamic state and a static state. In the static state, first flexible connector 180 and second flexible connector 190 may contain slack, and may not be taut. In the dynamic state, first flexible connector 180 and second flexible connector 190 may be taut and may not contain slack and are contactable with shell 260 of wheelbarrow 330. Further, in the dynamic state, first flexible connector 180 and second flexible connector 190 may transmit force (e.g., assisting force) from assistant 320 through handle 340 to wheelbarrow 330 through lower brace 140. Force may then be transmitted from lower brace 140 to assist device 100 and then to wheelbarrow 330. According to assisted operation 300, operator 310 grasps handles 210 and applies a force (e.g., lifting force) to the handles, elevating legs 220 thereby facilitating movement (e.g., mobility, maneuverability, etc.) of wheelbarrow 330. In assisted operation 300, operator 310 may maintain the force on handles 210 while assistant 320 is providing the force on handle 340. When in the dynamic state, first flexible connector 180 and second flexible connector 190 may be in contact with shell 260 and may provide a force (e.g., supporting force) to shell 260. In assisted operation 300, operator 310 may apply an additional force on handles 210 in a desired direction of travel such that wheelbarrow 330 moves in the desired direction of travel. According to various embodiments, assisted operation 300 is advantageous compared to merely attaching a strap (e.g., rope, chain, connecting member, etc.) to wheel 230, legs 220, or other locations on wheelbarrow 330. For example, the supporting force provided to shell 260 by first flexible connector 180 and second flexible connector 190 may be provided over an area and/or a width of wheelbarrow 330, rather than at a single point. As shown in FIG. 2, a distance between first flexible connector 180 and second flexible connector 190 may be established. This distance between first flexible connector 180 and second flexible connector 190 may allow the supporting force to be applied to various locations and/or areas of shell 260. Accordingly, assisted operation 300 may provide additional support of wheelbarrow 330 in multiple dimensions compared to a strap (e.g., rope, chain, connecting member, etc.) configured to merely help a person pull a wheelbarrow.

According to assisted operation 300, first flexible connector 180 and second flexible connector 190 are in the dynamic state. Due to the force transmitted through first flexible connector 180 and second flexible connector 190 in the dynamic state, any of upper brace 130, lower brace 140, and rear portions 160 may be in contact with top edge 250 and/or shell 260. For example, in assisted operation 300, assistant 320 may grasp handle 340, thereby imparting a force through first flexible connector 180 and second flexible connector 190. The force may be translated through lower brace 140 into assist device 100, where it is translated to wheelbarrow 330 through a combination of first coupling arm 110 (e.g., front portion 150, rear portion 160), second coupling arm 120 (e.g., front portion 150, rear portion 160), upper brace 130, and lower brace 140. In one embodiment, according to assisted operation 300, front portions 150 and rear portions 160 are in contact with top edge 250 and shell 260 and lower brace 140 is in contact with shell 260.

Conventional hand-propelled vehicles are utilized to transport material. During transportation, the conventional hand-propelled vehicle may become unsteady, resulting in difficult operation of the hand-propelled vehicle. Assist device 100 facilitates assisted operation 300 which may provide stabilized operation of wheelbarrow 330. Whereas a conventional wheelbarrow may only be stabilized by a number of wheels and a number of handles, wheelbarrow 330 may be stabilized by handles 210, wheel 230, and assist device 100 through first flexible connector 180 and second flexible connector 190. By utilizing first flexible connector 180 and second flexible connector 190, assist device 100 may supplement the effort of operator 310 with the effort of assistant 320. For example, assistant 320 may utilize assist device 100 to assist operator 310 in propulsion of wheelbarrow 330 (e.g., up an incline, etc.). Further, first flexible connector 180 and second flexible connector 190 may supplement wheel 230 when wheelbarrow 330 traverses uneven surfaces or is turned.

In addition to assisting in the movement of wheelbarrow 330, assist device 100 may also assist in other operations of wheelbarrow 330. For example, after loading and subsequently transporting material, it may be desirable to empty wheelbarrow 330 at a desired destination. At this point, operator 310 may remove any forces on handles 210 and assistant 320 may remove any forces on handle 340. After releasing handles 210, operator 310 may reposition first coupling arm 110 and/or second coupling arm 120 such that assist device 100 is coupled to front edge 360. At this time, operator 310 may reconfigure assist device 100 if desired. Assistant 320 may similarly perform these tasks after releasing handle 340. After repositioning assist device 100, first flexible connector 180 and/or second flexible connector 190 may be reoriented (e.g., moved, etc.) such that first flexible connector 180 and second flexible connector 190 are positioned underneath wheelbarrow 330 and are contactable with shell 260 of wheelbarrow 330. According to this embodiment, assistant 320 may impart a force on handle 340 resulting in a force translated through first flexible connector 180 and second flexible connector 190 causing wheelbarrow 330 to pivot about wheel 230 while operator 310 applies a force to handles 210 maintaining a position of wheel 230. In this manner, assistant 320 may utilize assist device 100 to aid in the emptying of wheelbarrow 330 of material. Similarly, in another example, first flexible connector 180 and second flexible connector 190 may be coupled to first lateral edge 370 or second lateral edge 380. According to this example, wheelbarrow 330 may be at least partially emptied over first lateral edge 370 or second lateral edge 380 allowing for another method of delivering material to a destination.

In another example, if wheelbarrow 330 is utilized to transport heavy material down a hill, assist device 100 may be coupled to front edge 360 such that assistant 320 may provide a force to handle 340, and thereby to first flexible connector 180 and second flexible connector 190, resisting a gravitational force of wheelbarrow 330 down the hill. Assist device 100 may similarly be coupled to first lateral side 370 and second lateral side 380 such that emptying as well as other operations of wheelbarrow 330 are assisted by assistant 320.

In various examples, assistant 320 may interact with handle 340 in a variety of ways. As shown in FIG. 3, assistant 320 may grasp handle 340 in front of assistant 320, and provide a force (e.g., push, etc.) on handle 340 that is substantially directed in front of assistant 320. In other examples, assistant 320 may grasp handle 340 behind assistant 320, and provide a force (e.g., pull, etc.) on handle 340 that is substantially directed in front of assistant 320. In some examples, handle 340 is substantially bar shaped. In some embodiment, handle 340 has a cylindrical cross section. In other examples, handle 340 may have a triangular, square, or other polygonal cross section. In some examples, handle 340 may have an asymmetrical cross section configured to facilitate grasping by assistant 320. In various embodiments, handle 340 is configured to be rigid. However, handle 340 may be deformable in some applications. According to various embodiments, assistant 320 is a human. However, in alternative embodiments, assistant 320 is an animal such as a donkey, mule, goat, steer, or horse.

According to various examples, various components of assist device 100 may be constructed and assembled through a number of processes. For example, first coupling arm 110 and second coupling arm 120 may be constructed from a single piece of material (e.g., sheet metal, metal, aluminum, steel, etc.) by first creating a first arm blank, for one of first coupling arm 110 and second coupling arm 120 and a second arm blank for the other of first coupling arm 110 and second coupling arm 120. The first arm blank and the second arm blank may then be deformed (e.g., bent) such that front portion 150 and rear portion 160 are separated by a distance configured to receive a portion of top edge 250, such as rear edge 350, front edge 360, first lateral edge 370, or second lateral edge 380. The first arm blank may be deformed according to a first desired profile and the second arm blank may be deformed according to a second arm profile, such that each of first coupling arm 110 and second coupling arm 120 may be tailored for a target application. In some embodiments, the first desired profile and the second desired profile are the same or similar. In some examples, upper brace 130 and lower brace 140 may be constructed from a similar material, and may be cut to equal lengths, such that a length of upper brace 130 is equal to a length of lower brace 140. However, in some examples, it may be desirable for the length of upper brace 130 to be greater than the length of lower brace 140, and vice versa. For example, in an application where first flexible connector 180 and second flexible connector 190 are coupled to lower brace 140, the length of lower brace 140 determines a possible number of positions of first flexible connector 180 and second flexible connector 190. Accordingly, it may be desirable to provide a length of lower brace 140 that is greater than the length of upper brace 130 such that a larger number of possible positions of first flexible connector 180 and second flexible connector 190 are possible. By providing for a large number of possible positions of first flexible connector 180 and second flexible connector 190, assist device may be utilized on a variety of hand-propelled vehicles by accounting for various wheel positions and other constraints of the various hand-propelled vehicles.

To assembly assist device 100, a number of holes may be formed (e.g., drilled, punched, etc.) in first coupling arm 110, second coupling arm 120, upper brace 130, and lower brace 140. The holes formed in first coupling arm 110 and second coupling arm 120 may correspond to desirable positions of upper brace 130 and lower brace 140. The holes in first coupling arm 110, second coupling arm 120, upper brace 130, and lower brace 140 may be threaded (e.g., tapped) such that fasteners 170 may threadably couple to the holes. Fasteners (e.g., fasteners 170) may then be utilized to interconnect first coupling arm 110, second coupling arm 120, upper brace 130, and lower brace 140. Each of first coupling arm 110, second coupling arm 120, upper brace 130, and lower brace 140 may contain equal numbers of holes (two, three, etc.).

In some applications, it may be desirable to have upper brace 130 and/or lower brace 140 selectively repositionable between a number of corresponding holes on first coupling arm 110 and/or second coupling arm 120. For example, use of assist device 100 with a first wheelbarrow (e.g., wheelbarrow 200) may correspond to a first desirable configuration of lower brace 140 corresponding to a first set of corresponding holes on first coupling arm 110 and/or second coupling arm 120. Following this example, use of assist device 100 with a second wheelbarrow (e.g., wheelbarrow 330) may correspond to a second desirable configuration of lower brace 140, different from the first desirable configuration of lower brace 140, corresponding to a second set of corresponding holes on first coupling arm 110 and/or second coupling arm 120. In various embodiments, first coupling arm 110 and second coupling arm 120 contain a plurality of holes configured to receive fasteners 170 such that upper brace 130 and/or lower brace 140 are selectively repositionable between a number of positions defined by the holes.

Similarly, in other applications it may be desirable to have first coupling arm 110 and/or second coupling arm 120 selectively repositionable between a number of corresponding holes on upper brace 130 and/or lower brace 140. For example, use of assist device 100 with a first wheelbarrow (e.g., wheelbarrow 200) may correspond to a first desirable configuration of first coupling arm 110 and second coupling arm 120 corresponding to a first set of corresponding holes on upper brace 130 and/or lower brace 140. Following this example, use of assist device 100 with a second wheelbarrow (e.g., wheelbarrow 330) may correspond to a second desirable configuration of first coupling arm 110 and second coupling arm 120, different from the first desirable configuration of first coupling arm 110 and second coupling arm 120, corresponding to a second set of corresponding holes on upper brace 130 and/or lower brace 140. In various embodiments, upper brace 130 and lower brace 140 contain a plurality of holes configured to receive fasteners 170 such that first coupling arm 110 and/or second coupling arm 120 are selectively repositionable between a number of positions defined by the holes.

In some applications, it may be desirable to reconfigure assist device 100 such that first flexible connector 180 and second flexible connector 190 may be coupled to various combinations of upper brace 130 and lower brace 140. For example, use of assist device 100 with a first wheelbarrow (e.g., wheelbarrow 200) may correspond to a first configuration where first flexible connector 180 and second flexible connector 190 are coupled to lower brace 140. However, use of assist device 100 with a second wheelbarrow (e.g., wheelbarrow 330) may correspond to a second configuration where first flexible connector 180 and second flexible connector 190 are coupled to upper brace 130. In yet another example, use of assist device 100 with a third wheelbarrow may correspond to a third configuration where first flexible connector 180 and second flexible connector 190 are coupled to upper brace 130 and lower brace 140. According to various embodiments, first flexible connector 180 and second flexible connector 190 are selectively repositionable between a number of positions corresponding to a number of combinations of upper brace 130 and lower brace 140.

At various times, such as when a user procures a new hand-propelled vehicle (e.g., wheelbarrow), it may be desirable to reconfigure assist device 100. In addition to the aforementioned capabilities, the various components of assist device 100 may be interchanged or upgraded such that assist device 100 may be tailored for a target application. For example, after a period of use, it may be desirable to replace handle 340. According to one embodiment, fasteners 170 configured to secure lower brace 140 to first coupling arm 110 and second coupling arm 120 may be removed such that first flexible connector 180 and/or second flexible connector 190 may be removed, thereby allowing handle 340 to be replaced by a new handle. Similarly, it may be desirable to interchange various components of assist device 100 to reconfigure assist device 100 for a particular application. For instance, a user may remove fasteners 170 securing first coupling arm 110 and second coupling arm 120 to upper brace 130 and lower brace 140 such that first coupling arm 110 and/or second coupling arm may be interchanged with a different coupling arm, such that assist device 100 may be tailored for a target application.

Figure 7:
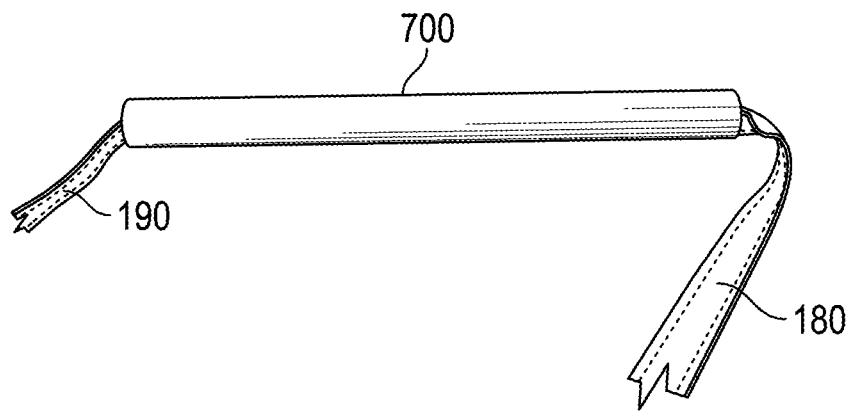
FIG. 7 is a top view of a handle for the assist device shown in FIG. 1, according to an exemplary embodiment of the present disclosure.
Figure 8:
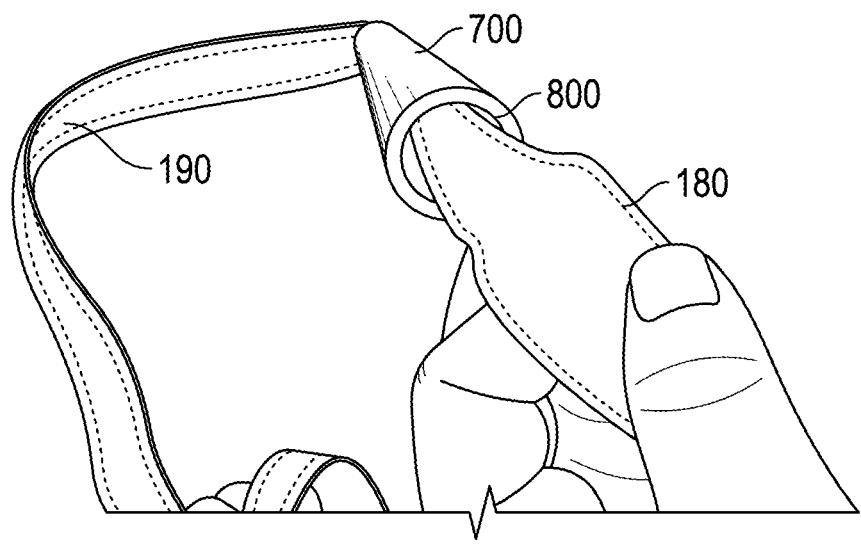
FIG. 8 is a side view of the handle shown in FIG. 7.

Referring to FIGS. 7-8, a handle, shown as handle 700 is coupled to first flexible connector 180 and second flexible connector 190. According to various embodiments, handle 700 is configured to receive first flexible connector 180 and second flexible connector 190. In one embodiment, first flexible connector 180 and second flexible connector 190 constitute a single flexible member. According to this embodiment, the single flexible member may run through a center portion, shown as center portion 800, of handle 700. Handle 700 may be textured, coated, or covered in a manner that is desirable to a user (e.g., assistant 320). For example, handle 700 may be wrapped in a material such a tape or rubberized stripping. In some embodiments, handle 340 is the same as handle 700. Center portion 800 may be sized to facilitate use of various forms of first flexible connector 180 and second flexible connector 190. For example, center portion 800 may be configured to receive a rope material or a strap material. Similarly, center portion 800 may have any suitable cross section. In some embodiments, center portion 800 has a cross section that is circular. In other examples, center portion 800 may have a cross section that is asymmetrical, triangular, or square.

It is to be understood that the description and components of wheelbarrow 200 or wheelbarrow 330 such as handles 210, legs 220, wheel 230, trough 240, top edge 250, and shell 260 are illustrative only and that assist device 100 could similarly cooperate with any other suitable hand-propelled vehicle (e.g., a different wheelbarrow, a smaller wheelbarrow, a larger wheelbarrow, a wheelbarrow with multiple wheels, a dolly, a cart, a hand cart, a hand truck, etc.).

It should be noted that references to "front," "rear," "upper," "top," "bottom," "base," and "lower" in this description are merely used to identify the various elements as they are oriented in the Figures. These terms are not meant to limit the element which they describe, as the various elements may be oriented differently in various temperature controlled cases.

Further, for purposes of this disclosure, the term "coupled" means the joining of two members directly or indirectly to one another. Such joining may be stationary in nature or moveable in nature and/or such joining may allow for the flow of fluids, electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

It is important to note that the construction and arrangement of the elements of temperature controlled case and the angled discharge diffuser provided herein are illustrative only. Although only a few exemplary embodiments of the present inventions have been described in detail in this disclosure, those skilled in the art who review this disclosure will readily appreciate that many modifications are possible in these embodiments (e.g., the structure of the assist device, the configuration of the first coupling arm and the second coupling arm, etc.) without materially departing from the novel teachings and advantages of the disclosure. Accordingly, all such modifications are intended to be within the scope of the disclosure.

What is claimed:

1. An assist device for a hand-propelled vehicle comprising:
   a first coupling arm having a first front portion and a first rear portion separated by a first distance;
   a second coupling arm having a second front portion and a second rear portion separated by a second distance substantially equal to the first distance;
   an upper brace having a first length, configured to be fastened to the first coupling arm and the second coupling arm;
   a lower brace having a second length substantially equal to the first length, configured to be fastened to the first coupling arm and the second coupling arm;
   a first flexible connector coupled to at least one of the lower brace and the upper brace;
   a second flexible connector coupled to at least one of the lower brace and the upper brace; and
   a handle configured to receive the first flexible connector and the second flexible connector;
   wherein the upper brace is coupled to the first rear portion and the second rear portion;
   wherein the lower brace is coupled to the first rear portion and the second rear portion;
   wherein the lower brace is substantially parallel to the upper brace; and
   wherein the first coupling arm and the second coupling arm are configured to releasably couple the assist device to a portion of a top edge of the hand-propelled vehicle.

2. The assist device of claim 1, wherein the first flexible connector comprises a first looped interface;
   wherein the second flexible connector comprises a second looped interface; and
   wherein the first looped interface and the second looped interface are individually coupled to the lower brace.

3. The assist device of claim 1, wherein the first flexible connector and the second flexible connector are configured to be operable between a static state and a dynamic state;
   wherein an assisting force may be transmitted through the handle by an assistant causing the first flexible connector and the second flexible connector to be in the dynamic state;
   wherein in the dynamic state, the first flexible connector and the second flexible connector are configured to provide a supporting force to the shell of the hand-propelled vehicle;
   wherein in the dynamic state, the first flexible connector and the second flexible connector are configured to transmit the assisting force to the lower brace; and
   wherein the lower brace is configured to transmit the assisting force to the hand-propelled vehicle.

4. The assist device of claim 1, wherein the first length and the second length are larger than a width of a wheel of the hand-propelled vehicle;
   wherein the first flexible connector and the second flexible connector are separated by a separation distance; and
   wherein the separation distance is greater than the width of the wheel of the hand-propelled vehicle and less than the lesser of the first length or the second length.

5. The assist device of claim 1, wherein the first flexible connector and the second flexible connector are structurally integrated forming a single flexible connector; and
   wherein the handle is substantially located over a center portion of the single flexible connector.

6. A method for making an assist device for assisting in a maneuverability of a hand-propelled vehicle comprising:
   forming a first arm blank, a second arm blank, an upper brace, a lower brace, and a handle;
   deforming the first arm blank according to a first desired profile resulting in a first coupling arm;
   deforming the second arm blank according to a second desired profile resulting in a second coupling arm;
   inserting one of a first flexible connector and a second flexible connector through the handle;
   forming a looped interface on the first flexible connector and the second flexible connector;
   inserting the lower brace through the looped interface of the first flexible connector and the looped interface of the second flexible connector;
   securing the lower brace to the first coupling arm and the second coupling arm; and
   securing the upper brace to the first coupling arm and the second coupling arm.

7. The method for making an assist device of claim 6, wherein the first coupling arm, the second coupling arm, the upper brace, and the lower brace, are constructed from sheet metal; and
   wherein the first flexible connector and the second flexible connector are constructed from strap material.

8. The method for making an assist device of claim 6, further comprising, prior to securing the lower brace to the first coupling arm and the second coupling arm and prior to securing the upper brace to the first coupling arm and the second coupling arm:
   creating a first number of holes in the first coupling arm;
   creating a second number of holes in the second coupling arm;
   creating a third number of holes in the upper brace; and
   creating a fourth number of holes in the lower brace;
   wherein the lower brace is secured to the first coupling arm by a first fastener inserted through one of the first number of holes and one of the fourth number of holes;
   wherein the lower brace is secured to the second coupling arm by a second fastener inserted through one of the second number of holes and one of the fourth number of holes;
   wherein the upper brace is secured to the first coupling arm by a third fastener inserted through one of the first number of holes and one of the third number of holes; and
   wherein the upper brace is secured to the second coupling arm by a fourth fastener inserted through one of the second number of holes and one of the third number of holes.

9. The method for making an assist device of claim 8, wherein the first number of holes is equal to the second number of holes is equal to the third number of holes is equal to the forth number of holes; and
   wherein the first number of holes is two.

10. The method for making an assist device of claim 8, wherein a position of the first number of holes corresponds to a position of the second number of holes; and wherein the first number of holes is equal to the second number of holes.

11. The method for making an assist device of claim 8, wherein a position of the third number of holes corresponds to a position of one of the first number of holes and a position of one of the second number of holes; and
wherein the third number of holes is equal to two.

12. The method for making an assist device of claim 8, wherein a position of the fourth number of holes corresponds to a position of one of the first number of holes and a position of one of the second number of holes; and
wherein the fourth number of holes is equal to two.

13. The method for making an assist device of claim 8, wherein at least one of the first number of holes, the second number of holes, the third number of holes, and the fourth number of holes are threaded and configured to receive a fastener.

14. A method of assisting in a mobility of a wheelbarrow comprising:
coupling a first coupling arm and a second coupling arm of an assist device to a portion of a top edge of the wheelbarrow;
orienting a first flexible connector and a second flexible connector underneath the wheelbarrow such that the first flexible connector and the second flexible connector are contactable with a shell of the wheelbarrow;
causing a first force to be transmitted to a handle coupled to the first flexible connector and the second flexible connector;
causing a second force to be transmitted to handles of the wheelbarrow;
causing a third force to be transmitted to the handles of the wheelbarrow, elevating legs of the wheelbarrow;
causing a fourth force to be transmitted to the handle; and
maintaining the third force while the second force is provided.

15. The method of claim 14, further comprising:
causing a fifth force to be transmitted to the handles of the wheelbarrow, the fifth force transmitted in a desired direction of travel of the wheelbarrow;
wherein the fourth force causes at least one of the first flexible connector and the second flexible connector to contact the shell of the wheelbarrow.

16. The method of claim 14, wherein the fourth force is translated through the first coupling arm and the second coupling arm to the top edge of the wheelbarrow.

17. The method of claim 14, further comprising:
loading the wheelbarrow with material;
reaching a destination of the wheelbarrow;
removing the third force and the fourth force;
removing at least one of the first force and the second force;
repositioning the first coupling arm and the second coupling arm to couple the assist device to a front edge of the wheelbarrow;
reorienting the first flexible connector and the second flexible connector underneath the wheelbarrow such that the first flexible connector and the second flexible connector are contactable with the shell of the wheelbarrow;
causing a sixth force to be transmitted to the handle coupled to the first flexible connector and the second flexible connector;
causing a seventh force to be transmitted to the handles of the wheelbarrow;
causing an eighth force to be transmitted to the handles, the eighth force maintaining a position of at least one wheel of the wheelbarrow;
causing a ninth force to be transmitted to the handle, the ninth force causing the wheelbarrow to rotate about the at least one wheel of the wheelbarrow; and
maintaining the eighth force while the ninth force is being transmitted.

18. The method of claim 17, wherein the eighth force is further configured to cause the wheelbarrow to rotate about the at least one wheel of the wheelbarrow; and
wherein the ninth force causes at least one of the first flexible connector and the second flexible connector to contact the shell of the wheelbarrow.

19. The method of claim 14, further comprising:
loading the wheelbarrow with material;
reaching a destination of the wheelbarrow;
removing the third force and the fourth force;
removing at least one of the first force and the second force;
repositioning the first coupling arm and the second coupling arm to couple the assist device to a lateral edge of the wheelbarrow;
reorienting the first flexible connector and the second flexible connector underneath the wheelbarrow such that the first flexible connector and the second flexible connector are contactable with the shell of the wheelbarrow;
causing a tenth force to be transmitted to the handle coupled to the first flexible connector and the second flexible connector;
causing an eleventh force to be transmitted to the handles of the wheelbarrow;
causing a twelfth force to be transmitted to the handles of the wheelbarrow, the twelfth force maintaining a position of at least one wheel of the wheelbarrow;
causing a thirteenth force to be transmitted to the handle, the thirteenth force causing the wheelbarrow to rotate about the at least one wheel of the wheelbarrow; and
maintaining the twelfth force while the thirteenth force is provided.

20. The method of claim 19, wherein the twelfth force is further configured to cause the wheelbarrow to rotate about the at least one wheel of the wheelbarrow; and
wherein the thirteenth force causes at least one of the first flexible connector and the second flexible connector to contact the shell of the wheelbarrow.

* * * * *